S. LAPHAM.
Wheel Cultivator.
No. 10,197.
Patented Nov. 1, 1853.
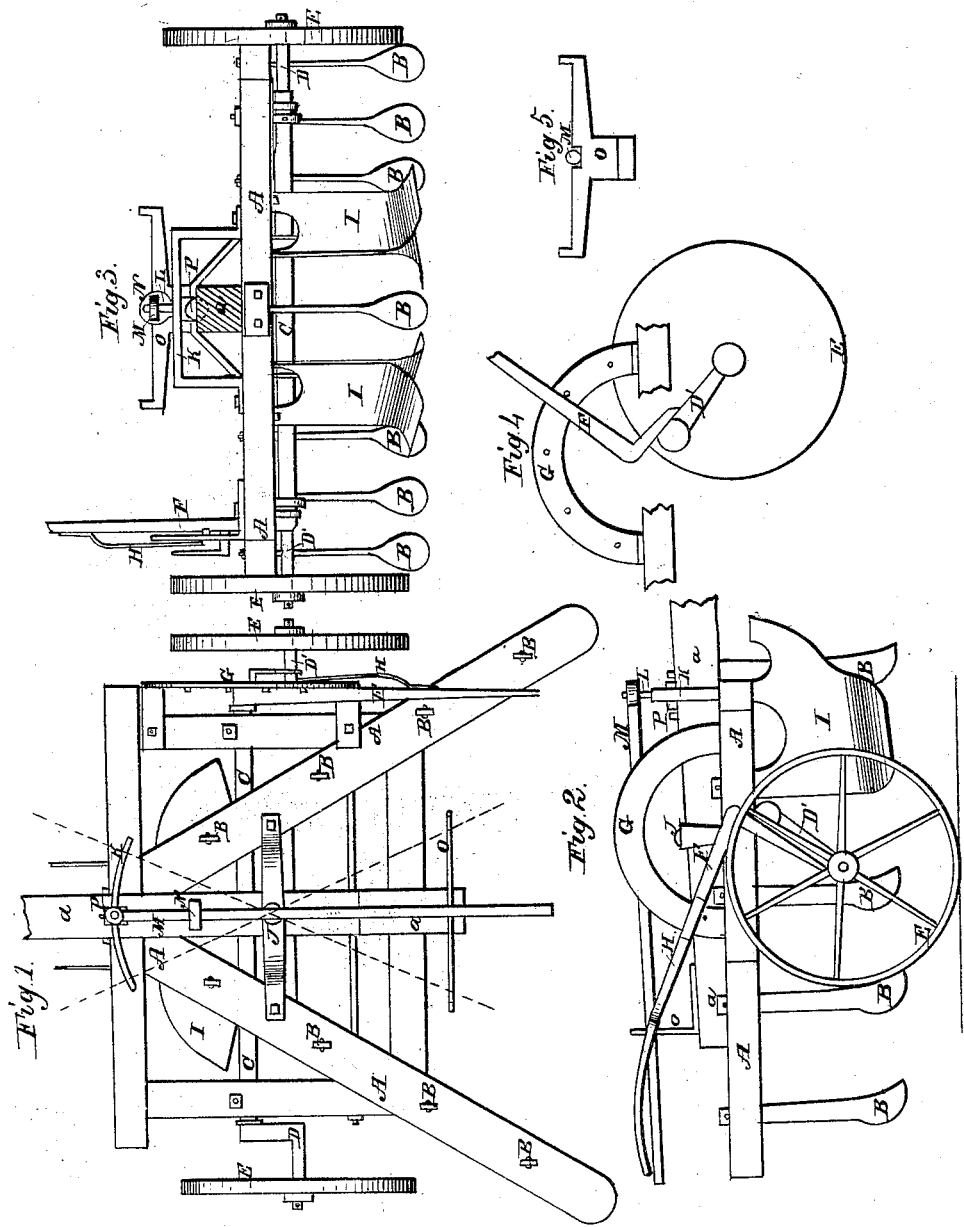

UNITED STATES PATENT OFFICE.

SENECA LAPHAM, OF SALEM, OHIO.

IMPROVEMENT IN DEVICES FOR STEERING CULTIVATORS.

Specification forming part of Letters Patent No. 10,197, dated November 1, 1853.

*To all whom it may concern:*

Be it known that I, SENECA LAPHAM, of Salem, in the county of Champaign and State of Ohio, have invented new and useful Improvements in the Construction of Cultivators; and I do hereby declare that the following is a full, clear, and exact description thereof, reference being had to the accompanying drawings, and to the letters of reference marked thereon.

Figure 1 is a plan view; Fig. 2, a side elevation, and Fig. 3 a front end view. The other views will be noticed hereinafter in the description.

Like letters refer to like parts in the different views.

A A A, Fig. 1, represent the frame-work of the machine; and *a a*, the tongue, to which the team is attached in the usual manner for operating the machine.

B, Figs. 2 and 3, are the cultivating-teeth. These may be made in the usual form and secured to the frame in any desirable manner. C, the axle or shaft, extending across the machine, and upon which the machine rests. The journals or bearings of the axle are at *c c*, as seen in Fig. 3. Outside of the journals and frame are double cranks, which are a continuation of the axle, as shown at D D', Fig. 1, thereby forming a double crank-axle. The cranks are on the same angle to each other as the shaft.

On the ends of the cranks are hung the wheels E E.

The lever F is attached to the crank D', as seen in the detached section, Fig. 4, by which means the wheels are raised and lowered, and the frame and teeth B correspondingly, so that the depth of the teeth in the ground may be gaged to any required depth by the action of the lever and crank on the wheels. The depth of the teeth in the ground will at all times be uniform, they being retained in place by the wheels upon which the machine is supported. In the rack G are inserted pins, as seen in Figs. 1 and 4, for the purpose of retaining the machine at any desired elevation or depression.

In Fig. 2 it will be observed that the lever F is depressed, which lowers the wheels E, and raises the teeth from the ground correspondingly. In Fig. 3 the lever is raised, and the wheels accordingly, which causes a corresponding depression or lowering of the teeth to the ground. By this arrangement the teeth are lowered and raised as may be required, so that it can traverse from one place to another without the teeth touching the ground, as seen in Fig. 2.

H is a spring for retaining the lever in place.

To the front of machine are secured the mold-boards I I, Figs. 2 and 3, which are of essential service when the machine is used (the front teeth being removed) to cultivate young corn, as the mold-boards prevent the earth from covering it up while the cultivating-teeth are breaking up the ground for the purpose of destroying the weeds.

The mold-boards I I can be detached and reversed in position, as indicated by the red lines in Fig. 3, which will throw the earth around the corn, instead of hoeing it. These mold-boards are reversed when the corn requires hoeing, and may be at the time of cultivating.

By removing the mold-boards entirely this machine may be used to advantage as a harrow for preparing land for grain, and also for dragging in the grain.

Another important feature of my improvement consists of the arrangement for giving the desired direction to the machine, as follows: The tongue *a* is secured to the frame of the machine by the king bolt, J, which passes through it into the frame, which allows the tongue to receive a lateral motion or swing from the center or king-bolt, J. On the front of the frame is attached the brace K, under which passes the tongue.

From the top of the brace projects the arm L, Figs. 2 and 3, which passes through the eye in the end of the lever M, which acts as a fulcrum. The lever passes through the staple N, Figs. 1 and 3, which is secured to the tongue, so that any lateral movement of the lever is given directly to the tongue correspondingly. The back end of the lever rests in a slot upon the cross-tree O, Figs. 1, 3, and 5. When traversing in a direct course, and when it is desirable to shun any obstruction or to avoid injuring corn or potatoes in hills, the lever M may be turned in either direction indicated by the red lines in Fig. 1, which will cause the machine to be directed in the desired course independent of the team. Under the brace K is a friction-roller, P, for the purpose of easing the action of the machine when changing its direction by the lever M.

In operating the machine the person walks behind with the lines of the team in his hand, which position allows him to readily change direction of the machine at any time, and also to raise and lower it to and from the ground, as may be convenient, by the lever F, in the manner before mentioned.

What I claim as my improvement, and desire to secure by Letters Patent, is—

The combination and arrangement of the parts consisting of the lever M and its attachment to the brace K, and the connection of the tongue $a$ to the lever by the staple N, in its application to the purpose of changing the direction of this and other machines, as specified.

SENECA LAPHAM.

Witnesses:
  I. A. LAPHAM,
  WM. LAPHAM.